(12) United States Patent
Tsubouchi et al.

(10) Patent No.: US 6,783,723 B2
(45) Date of Patent: Aug. 31, 2004

(54) POLYAMIDE FILM PRODUCTION METHOD

(75) Inventors: Kenji Tsubouchi, Uji (JP); Fumihiko Hosokawa, Uji (JP)

(73) Assignee: Unitika Ltd., Hyogo (JP)

( * ) Notice: Subject to any disclaimer, the term of this patent is extended or adjusted under 35 U.S.C. 154(b) by 402 days.

(21) Appl. No.: 10/022,085

(22) Filed: Dec. 17, 2001

(65) Prior Publication Data
US 2003/0025237 A1 Feb. 6, 2003

(30) Foreign Application Priority Data
Jul. 6, 2001 (JP) ........................................ 2001-205505

(51) Int. Cl.[7] .............................................. B29C 47/88
(52) U.S. Cl. ................ 264/556; 264/210.2; 264/211.13
(58) Field of Search ................................ 264/556, 555, 264/210.2, 211.13, 290.2, 331.19

(56) References Cited

U.S. PATENT DOCUMENTS

| | | | | | |
|---|---|---|---|---|---|
| 3,121,915 | A | * | 2/1964 | Heller, Jr. ..................... | 264/556 |
| 3,141,194 | A | * | 7/1964 | Jester ............................ | 425/404 |
| 3,159,696 | A | * | 12/1964 | Hodgson, Jr. ................ | 264/556 |
| 3,405,884 | A | * | 10/1968 | Patterson, Jr. ............. | 242/615.2 |
| 3,423,493 | A | * | 1/1969 | Klenk et al. ................. | 264/556 |
| 3,597,515 | A | * | 8/1971 | Widiger ....................... | 264/556 |
| 3,795,474 | A | * | 3/1974 | Heyer .......................... | 425/325 |
| 3,914,725 | A | * | 10/1975 | Williamson .................. | 335/140 |
| 3,930,923 | A | * | 1/1976 | Elliott ..................... | 156/244.17 |
| 4,255,365 | A | * | 3/1981 | Heyer .......................... | 264/468 |
| 4,310,295 | A | * | 1/1982 | Heyer .......................... | 425/224 |
| 4,428,724 | A | * | 1/1984 | Levy ............................ | 425/446 |
| 4,917,844 | A | * | 4/1990 | Komai et al. ................. | 264/85 |
| 5,030,409 | A | * | 7/1991 | Hisanaga et al. ........... | 264/556 |

FOREIGN PATENT DOCUMENTS

| | | |
|---|---|---|
| EP | 0051699 | 5/1982 |
| JP | 09155952 | 6/1997 |

* cited by examiner

Primary Examiner—Mark Eashoo
(74) Attorney, Agent, or Firm—Fildes & Outland, P.C.

(57) ABSTRACT

The present invention provides a method for industrially stably producing a stretched polyamide film having uniform properties at a high speed. The polyamide film production method comprises the steps of: extruding a molten polyamide resin from a die into a sheet form on a rotary cooling roll having a roughened surface; pressing the sheet against the surface of the cooling roll with an air layer being present between the cooling roll and the sheet by blowing air onto the sheet from an air knife apparatus for cooling the sheet, the air layer having a widthwise thickness distribution such that an average air layer thickness Te in lateral edge regions of the sheet is greater than an average air layer thickness Tc in a middle region of the sheet; and biaxially stretching the sheet.

8 Claims, 3 Drawing Sheets

POLYAMIDE FILM PRODUCTION METHOD

TECHNICAL FIELD

The present invention relates to a polyamide film production method which ensures stable high-speed production of a stretched polyamide film and, particularly, to a polyamide film production method which is characterized by a molten sheet cooling and solidifying process to be performed after a molten polyamide resin is extruded from a die.

BACKGROUND ART

In production of an unstretched sheet of a polyamide resin by a T-die method, a molten sheet extruded from a die is pressed against the surface of a rotary cooling roll (CR) called "casting roll" for cooling and solidification thereof.

For the pressing of the molten sheet against the CR, air is evenly blown along the width of the molten sheet by means of an air knife apparatus (hereinafter referred to as "air knife method"). Alternatively, an electrostatic adhesion method is employed in which electric charges are generated on the molten sheet by a high voltage electrode to cause the molten sheet to electrostatically adhere on the CR.

In the air knife method, adhesion between the molten sheet and the CR is weak. Therefore, the air knife method cannot be applied to a resin such as a polyester resin which undergoes a greater volume reduction during solidification thereof with a greater shrinkage factor, because a sheet of such a resin is liable to be dislodged from the surface of the CR. On the contrary, the air knife method can be applied to the polyamide resin.

In the air knife method, an air stream pressure associated with the rotation of the CR and a component of a melt tension are exerted on points of contact between the molten sheet and the CR, so that a lifting force acts on the molten sheet. Air is blown over the molten sheet on the CR surface to apply an air pressure against the lifting force by the air knife. However, a very small amount of air is trapped between the molten sheet and the CR thereby to form a thin air layer therebetween. In general, a sheet of a high-crystallinity polyamide resin is cooled at different cooling rates and, hence, has different crystallinities depending on the thickness of the air layer. The uniformity and stability of the crystallinity of the sheet are most important for controlling the stretching performance and operability of a high-speed stretched film production line.

Where a sheet production speed is relatively low, the air layer has a uniform thickness with little variation along the width of the sheet. Where the sheet production speed is increased, however, there is a disadvantage such that the air layer is not uniformly formed between the molten sheet and the CR surface. Since air is nonuniformly trapped between the molten sheet and the CR surface, there are greater variations in the thickness of the air layer, resulting in formation of spots. This phenomenon is particularly remarkable in edge portions of the sheet.

The spots formed in the edge portions of the sheet seriously hinder high-speed sheet feeding in the subsequent process. Particularly in a water absorption process, spots swelled by water absorption in the unstretched sheet hinder the sheet from passing straight in a hot water bath. This causes the sheet to meander and wrinkle, so that the sheet cannot properly be subjected to a water immersing process. As a result, high-speed production cannot be achieved.

Further, the spots formed in the edge portions of the sheet affect the stretching of the sheet in a stretching process. Where the crystallinity of the edge portions of the sheet is excessively low, the sheet is liable to be broken around the edge portions thereof when the stretching process is performed with the edge portions being held by tenter clips. This results in an increase in breakage frequency, which is a serious problem for the production process. This reduces the yield of the product film, and deteriorates the physical properties (e.g., thickness uniformity, surface smoothness and shrinkage) of the resulting stretched film.

Where the electrostatic adhesion method is applied to the polyamide resin, electric charges are transferred to the T-die and the CR because the molten polyamide resin has a high electric conductivity. In the high-speed sheet production, high-amperage electric discharge is required for the molten sheet to have residual electric charges sufficient to generate a Coulomb force for adhesion to the CR. However, the electrode has a limited electric discharge capacity, so that the electrostatic adhesion method poses a limitation to the sheet production speed.

Where the electrostatic adhesion method is employed for the production of the polyamide resin sheet, the breakage of the sheet frequently occurs in the stretching process. The cause of the sheet breakage is not clarified, but the sheet breakage is supposedly caused by a damage to the sheet due to local electric discharge, and by unstable water absorption and stretching behavior attributable to an extremely low crystallinity of the sheet due to abrupt cooling of the molten sheet on the CR without the intervention of an air layer between the sheet and the CR.

As described above, the prior art fails to provide a satisfactory film production method which ensures industrially stable high-speed production of a stretched polyamide film.

SUMMARY OF THE INVENTION

It is an object of the present invention to provide a film production method in which an unstretched polyamide sheet having a moderate and uniform crystallinity is produced to ensure stable high-speed sheet feeding in the subsequent process thereby to industrially produce a stretched polyamide film having uniform physical properties at a high speed with a high productivity.

As a result of intensive studies for achieving the aforesaid object, the inventors of the present invention have found that an unstretched sheet having a moderate and uniform crystallinity can be produced by controlling the widthwise distribution of the average thickness of an air layer present between a CR surface and a molten sheet in the air knife method, whereby a stretched polyamide film having uniform physical properties can stably be produced at a high speed.

In accordance with the present invention, there is provided a polyamide film production method, which comprises the steps of: extruding a molten polyamide resin from a die into a sheet form on a rotary cooling roll having a roughened surface; pressing the sheet against the surface of the cooling roll with the intervention of an air layer between the cooling roll and the sheet by blowing air on the sheet from an air knife apparatus for cooling the sheet, the air layer having a widthwise thickness distribution such that an average air layer thickness Te in lateral edge regions of the sheet is greater than an average air layer thickness Tc in a middle region of the sheet; and biaxially stretching the sheet.

EMBODIMENT OF THE INVENTION

The present invention will hereinafter be described in detail.

Figure 1:
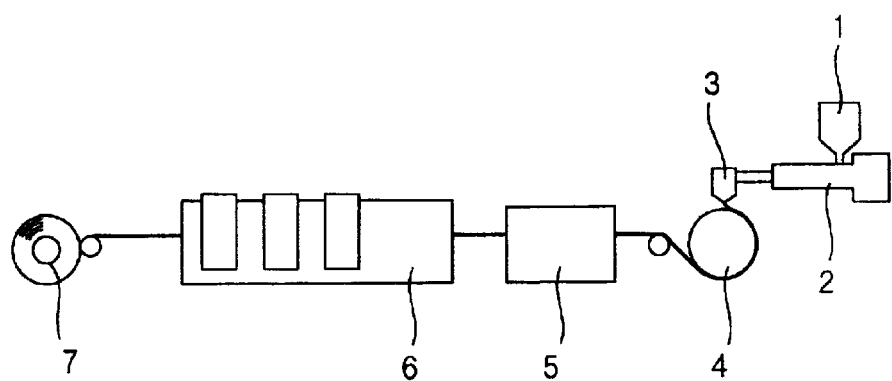
FIG. 1 is a diagram for explaining a polyamide film production method according to one embodiment of the present invention.

FIG. 1 is a process diagram for explaining a common method for production of a stretched polyamide film.

First, material resin pellets (polyamide resin pellets) are supplied into a hopper 1, and melted in an extruder 2 for plasticization thereof. The molten polyamide resin is extruded from a T-die 3 attached to a distal end of the extruder 2, and cooled on a CR 4 for solidification thereof. The resulting sheet is passed through a water absorption process section 5 and then through a stretching process section 6 thereby to be stretched biaxially (i.e., longitudinally and transversely). Then, the stretched polyamide film is wound up as a product film 7.

Figure 2:
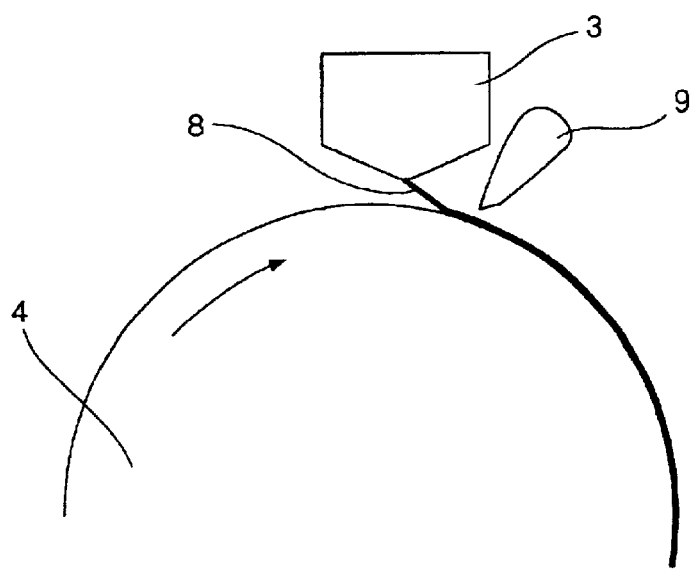
FIG. 2 is a side view for explaining a sheet production method employing an air knife method in accordance with the present invention.

FIG. 2 is a side view for explaining a sheet production method employing an air knife method in accordance with the present invention.

A molten polyamide sheet 8 is extruded from the T-die 3 onto the surface of the CR 4. The molten polyamide sheet 8 is pressed against the surface of the CR 4 by applying an air pressure thereto from an air knife apparatus 9 thereby to be cooled for solidification thereof. Air taken into the air knife apparatus by a high pressure blower passes between baffle plates and is blown from slit gaps along the width of the molten sheet.

Figure 3:
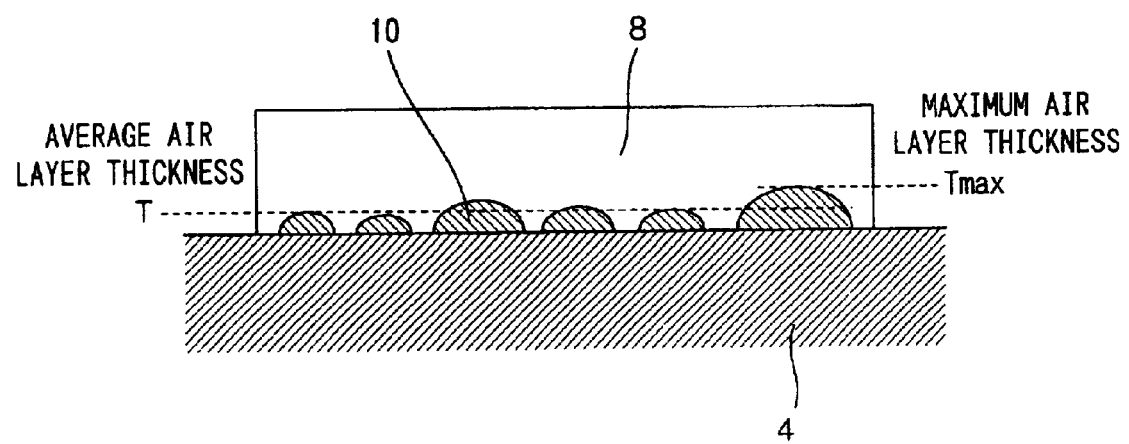
FIG. 3 is schematic diagram for explaining an average air layer thickness and a maximum air layer thickness in accordance with the present invention.

FIG. 3 is schematic diagram for explaining the average thickness and maximum thickness of an air layer present between the molten sheet and the CR in accordance with the present invention. A very small amount of air 10 is trapped between the surface of the CR 4 and the molten sheet 8, so that the molten sheet 8 is partly brought into point contact with the CR 4 at random. An average air layer thickness T herein means the average of the heights of trapped air bubbles arranged in a sheet feeding direction (or longitudinally of the sheet), and a maximum air layer thickness Tmax herein means the greatest one of the heights of the trapped air bubbles.

Figure 4:
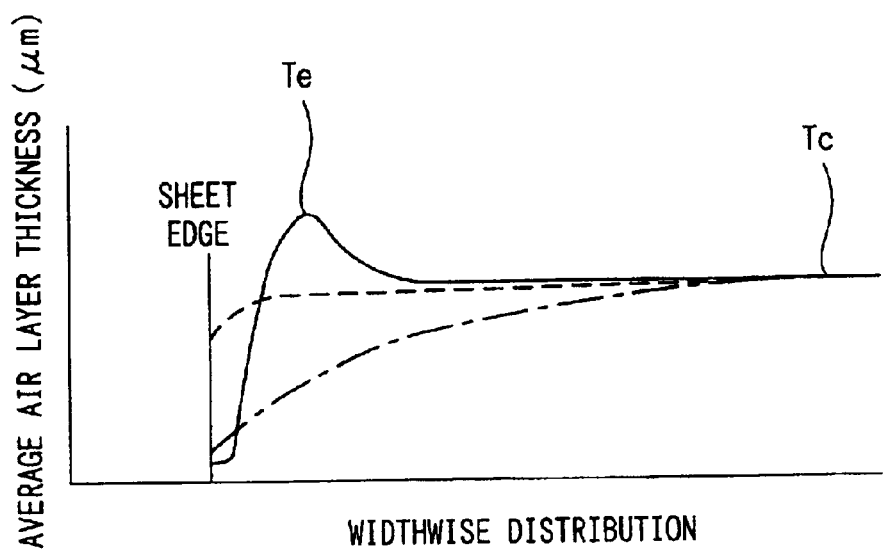
FIG. 4 is a diagram illustrating the widthwise distribution of the average thickness of an air layer present between a cooling roll and a sheet in accordance with the present invention.

FIG. 4 is a diagram illustrating the widthwise distribution of the average thickness of the air layer present between the cooling roll and the sheet. More specifically, FIG. 4 illustrates the distribution of the average air layer thickness T along the width of the sheet from lateral edges to a middle portion of the sheet. The widthwise distribution of an average air layer thickness according to the prior art falls within a range defined between a broken line and a one-dot-and-dash line. In the case of the prior art, the air layer has a smaller thickness and greater variations. On the other hand, the widthwise distribution of the average air layer thickness according to the present invention is indicated by a solid line. In FIG. 4, the maximum average air layer thickness in lateral edge regions of the sheet is indicated by Te, and the average air layer thickness in a middle region of the sheet is indicated by Tc.

The position of Te is preferably located in a sheet edge region defined between a portion of the sheet held by tenter clips and the edge of the sheet and not subjected to the biaxial stretching. This is because it is necessary to impart a sufficient stretching stress resistance to the edge portion of the sheet held by the tenter clips to be virtually stretched only uniaxially and to properly form the middle portion of the sheet to be thereafter uniformly biaxially stretched for production of the stretched film product.

In the present invention, it is most important to perform the cooling process with the average air layer thickness Te in the lateral edge regions of the sheet being greater than the average air layer thickness Tc in the middle region of the sheet in order to ensure both the stable high-speed sheet feeding and the uniform stretching by controlling the crystallinity of the edge portions of the sheet and the crystallinity of the middle portion of the sheet to be biaxially stretched.

Exemplary methods for the formation of the air layer to satisfy the relationship of the average air layer thicknesses of Te>Tc are such that: the air pressure in the air knife is varied along the width of the sheet for the air blowing; the air pressure is controlled by varying the direction (angle) of the air blow from the air knife along the width of the sheet so as to apply a lower air pressure to the edge portions of the sheet; the lateral edge portions of the sheet are pressed against the CR surface with the use of separately provided side air nozzles prior to the application of air by means of the air knife, and the width and pressure of the air blow are controlled so that the air present between the molten sheet and the CR is controllably expelled; and the surface roughness of the CR is varied in accordance with the air layer thickness distribution along the width of the sheet, but not limited thereto.

Where the edge portions of the sheet are moderately pressed with the use of the side air nozzles, for example, it is advantageous that the equipment cost is the lowest and the air blow can be controlled during the sheet production, but it is technically disadvantageous that the average air layer thickness Te becomes unstable if the air blow angle, height and press position of the nozzles are improper.

In the present invention, the average thickness of the air layer is also important for controlling the cooling rate of the molten sheet to impart the sheet with a proper crystallinity.

The air layer preferably has an average thickness T ($\mu$m) of $10 \leq T \leq 100$, and a maximum thickness Tmax ($\mu$m) of Tmax<150. If the average thickness of the air layer is smaller than 10 $\mu$m, the resulting sheet has an excessively low crystallinity and, hence, suffers from elongation and width variations in the subsequent water absorption process. Further, the sheet is less stable with a higher dependence on the stretching temperature thereby to suffer from unpredictable thickness variations. If the air layer partly has a thickness of greater than 150 $\mu$m, the cooling rate of the molten sheet is remarkably reduced, so that spherulites grow in the polyamide resin to form higher-crystallinity spots in the sheet. Where the sheet having the higher-crystallinity spots is stretched, stretch spots are formed in the stretched film due to necking and, therefore, breakage of the sheet frequently occurs during the stretching process, resulting in difficulty in stable film production.

In the present invention, the ratio (Te/Tc) of the average air layer thickness Te in the lateral edge regions of the sheet to the average air layer thickness Tc in the middle region of the sheet is in the range of 1.1 to 2.5. If the ratio is out of the aforesaid range, the edges of the sheet are liable to slacken or tauten, making it impossible to feed the sheet at a high speed.

Where the present invention is applied to flat sheet production in which the thickness of edge portions of a molten sheet is reduced by controlling a polymer flow at edges of a T-die as in a recent advanced T-die technique, the stable high-speed sheet feeding and the uniform stretching can be ensured.

In the present invention, the CR surface may be roughened for the distribution of the trapped air. Thus, the air layer thickness is made uniform to properly form a multiplicity of points of contact between the sheet and the CR surface. With the multiplicity of points of contact between the CR surface and the molten sheet, transfer of the rough surface profile of the CR onto the sheet presents virtually no problem. The multiplicity of points of contact formed at random can ensure easy self-release of monomers deposited on the CR surface.

The CR preferably has an average surface roughness along a center line SRa ($\mu$m) of $0.2 \leq SRa \leq 1.0$, and a maximum surface roughness SRmax ($\mu$m) of $1 \leq SRmax \leq 4$. If the surface roughness of the CR is excessively great, the trapped air is easily expelled. Therefore, a thin and uniform air layer is provided between the molten sheet and the CR by application of a lower air pressure, and easy self-release of the monomers deposited on the CR surface is ensured. However, the rough surface profile of the CR is disadvantageously transferred onto the molten sheet. If the surface roughness of the CR is smaller, the distribution of the trapped air is difficult, making it impossible to provide a uniform-thickness air layer even by application of a high air pressure.

The air pressure is preferably in the range of 3 to 10 kPa. If the air pressure is lower than 3 kPa, it is impossible to provide a uniform and thin air layer. If the air pressure is higher than 10 kPa, the applied air flows back to the T-die to cool the T-die, and vibrates the molten sheet. This results in a sheet production failure.

In the present invention, the CR is a rotary cooling roll constructed such that a coolant (cooling water) is circulated therein. The CR has a surface coating formed by hard chromium plating or ceramic spray coating. A ceramic spray-coated roll is more preferred because the monomers are less liable to deposit thereon.

The temperature of the sheet to be removed from the CR surface may be changed as desired by controlling the temperature of the coolant circulating in the CR, the surface roughness of the CR and the average thickness of the air layer. The surface temperature of the CR is preferably in the range of 15 to 60° C. If the surface temperature of the CR is lower than 15° C., water is condensed on the CR surface, so that adhesion spots are formed on the sheet due to a water film to cause a trouble in the sheet production. If the surface temperature is higher than 60° C., it is difficult to release the sheet from the CR surface. Therefore, the sheet is longitudinally elongated by a releasing stress to form spots due to thickness variations, resulting in deterioration of the planarity of the sheet.

In the present invention, the circumferential speed of the CR is controlled so that the unstretched sheet can be fed into the stretching process section at a high speed, i.e., at a speed not lower than 100 m/min, which cannot be realized in the prior art.

Examples of the polyamide resin to be employed in the present invention include homopolymers such as nylon 6, nylon 66, nylon 11 and nylon 12, and copolymers and blends thereof.

The polyamide resin may contain known additives such as a stabilizing agent, an anti-oxidation agent, a filler, a lubricating agent, an anti-static agent, an anti-blocking agent, and a coloring agent.

In the present invention, a simultaneous biaxial stretching method or a sequential biaxial stretching method can be employed for stretching the polyamide sheet. The biaxial stretching is preferably achieved with the use of a tenter driven by a linear motor. The tenter in which clips are individually driven by the linear motor is more preferable than solely mechanical tenters such as a pantograph-type tenter and a screw-type tenter for speed-up of the stretching process. This is because the stretching should be performed at not lower than 300 m/min for continuous production in consideration of the traveling speed of the tenter determined by multiplying the circumferential speed of the CR by a longitudinal stretching factor (×3.0) for a common polyamide resin in accordance with the present invention.

In the present invention, the widthwise distribution of the average thickness of the air layer present between the CR surface and the molten sheet is controlled within the predetermined range in the air knife method, whereby the formation of the spots in the edge portions of the sheet is suppressed. Thus, an unstretched sheet can be provided which has a uniform and moderate crystallinity along the width of a portion thereof to be thereafter biaxially stretched.

With the unstretched sheet having a crystallinity thus properly controlled along the width thereof, stable high-speed sheet feeding and stretching can be ensured in the subsequent process for producing a stretched polyamide film having uniform properties at a high speed with a high productivity.

The present invention will hereinafter be described more specifically by way of examples thereof.

EXAMPLES

In the present invention, the following properties were determined in the following manner.

(1) Air Layer Thickness

The air layer thickness was measured by means of a laser focus displacement meter available from Keyence Corporation.

(2) CR Surface Roughness and Sheet Surface Roughness

The average surface roughness (SRa) along the center line and the maximum surface roughness (SRmax) were determined in conformity with JIS-B0601-1982 with a cut-off of 0.8 mm. For the determination of the surface roughness of the unstretched polyamide sheet, the measurement was performed on a CR-contact surface (R-surface) and a CR-noncontact surface (A-surface) of the sheet.

(3) High-speed Sheet Feeding Performance

The high-speed sheet feeding performance was evaluated on the basis of a meandering offset of the unstretched sheet observed at an outlet of the water absorption process section.
Excellent (○): Meandering offset≦20 mm/5 min
Acceptable (Δ):
  20 mm/5 min<Meandering offset<100 mm/5 min
Unacceptable (x): Meandering offset≧100 mm/5 min (4) Stretchability The biaxial stretchability of the polyamide sheet was evaluated on the basis of the number of times of breakage of the sheet.
Excellent (○): Breakage≦Once/24 hours
Acceptable (Δ):
  Twice/24 hours<Breakage<9 times/24 hours
Unacceptable (x): Breakage≧10 times/24 hours Example 1

A 630-mm wide T-die was attached to an extruder having a cylinder diameter of 175 mm, and nylon 6 (A1030BRF available from Unitika Ltd.) was melt and extruded into a sheet form at an extrusion temperature of 260° C. The molten sheet was pressed against a CR having a hard chromium plated surface having an average surface roughness SRa of 0.6 μm, a maximum surface roughness SRmax of 2.5 μm and a diameter of 1200 mm and rotating at a circumferential speed of 80 m/min by an air knife method for production of a 150-μm thick unstretched polyamide sheet.

An air knife apparatus having a lip gap of 1 mm, a width of 600 mm and an air pressure of 4 kPa was employed for the air knife method, and the surface temperature of the CR was kept at 20° C. The widthwise distribution of the average air layer thickness was controlled with the use of side air nozzles so that an air layer having a thickness Tc of 20 μm and a thickness Te of 25 μm was formed between the sheet and the CR. The maximum air layer thickness Tmax was 35 μm.

The sheet was immersed in a 60° C. water in a hot water bath for one minute, and then stretched longitudinally by 3.0 times and transversely by 3.3 times at a stretching temperature of 175° C. by a tenter-type simultaneous biaxial stretching apparatus. Subsequently, the sheet was subjected to a heat treatment at 210° C. with a relax ratio of 5%. Thus, a biaxially stretched polyamide film having a thickness of 15 μm was produced.

As shown in Table 1, the high-speed sheet feeding performance was excellent with no trouble in feeding the unstretched polyamide sheet. Further, the sheet had an excellent stretchability.

The rough surface profile of the CR was not transferred to the R-surface of the sheet, and the CR-noncontact surface (A-surface) of the sheet had the same roughness level. No monomer was deposited on the surface of the CR.

TABLE 1

|  | Example 1 | Example 2 | Example 3 | Comparative Example 1 |
|---|---|---|---|---|
| Air layer thickness (μm) | | | | |
| Te | 25 | 40 | 20 | 15 |
| Tc | 20 | 30 | 15 | 20 |
| Tmax | 35 | 45 | 25 | 35 |
| Te/Tc | 1.25 | 1.33 | 1.33 | 0.75 |
| Surface roughness SRmax (μm) of unstretched sheet | | | | |
| R-surface | 0.3 | 0.3 | 0.4 | 0.3 |
| A-surface | 0.3 | 0.3 | 0.3 | 0.3 |
| Monomer deposition on casting roll | No | No | No | No |
| High-speed feeding | ○ | ○ | ○ | X |
| Stretchability | ○ | ○ | ○ | Δ |

Example 2

A biaxially stretched polyamide film was produced in substantially the same manner as in Example 1, except that the extrusion rate of the polyamide resin was increased, the sheet production rate was 120 m/min, the air knife pressure was 8 kPa, and the average air layer thicknesses Tc and Te were adjusted to 30 μm and 40 μm, respectively, by adjusting the press positions of the side air nozzles. The results of the evaluation performed in the same manner as in Example 1 are shown in Table 1. The high-speed sheet feeding performance and the stretchability were excellent.

Example 3

A biaxially stretched polyamide film having a thickness of 25 μm was produced in substantially the same manner as in Example 1, except that the resin extrusion rate was increased and the sheet production rate was 55 m/min. The results of the evaluation performed in the same manner as in Example 1 are shown in Table 1.

Comparative Example 1

A stretched polyamide film was produced in substantially the same manner as in Example 1, except that the average air layer thickness Te was 15 μm (Tc was 20 μm).

As shown in Table 1, an unstretched polyamide sheet produced in Comparative Example 1 suffered from width variations and wrinkling in the water absorption process, so that the high-speed sheet feeding was impossible. In addition, the stretchability was unacceptable with frequent breakage of the sheet during the stretching process.

Thus, the present invention provides the method for industrially stably producing a stretched polyamide film having uniform properties at a high speed.

What is claimed is:

1. A polyamide film production method, comprising the steps of:

extruding a molten polyamide resin from a die into a sheet form on a rotary cooling roll having a roughened surface;

pressing the sheet against the surface of the cooling roll with the intervention of an air layer between the cooling roll and the sheet by blowing air onto the sheet from an air knife apparatus for cooling the sheet, the air layer having a widthwise thickness distribution such that an average air layer thickness Te in lateral edge regions of the sheet is greater than an average air layer thickness Tc in a middle region of the sheet; and biaxially stretching the sheet.

2. A polyamide film production method as set forth in claim 1, wherein the air layer present between the rotary cooling roll and the sheet has an average thickness T (μm) of 10≦T≦100 and a maximum thickness Tmax (μm) of Tmax<150, and a multiplicity of points of contact are present between the sheet and the rotary cooling roll.

3. A polyamide film production method as set forth in claim 1 or 2, wherein a ratio (Te/Tc) of the average air layer thickness Te in the lateral edge regions of the sheet to the average air layer thickness Tc in the middle region of the sheet is in the range of 1.1 to 2.5.

4. A polyamide film production method as set forth in claim 1 or 2, wherein the rotary cooling roll has an average surface roughness along a center line SRa (μm) of 0.2≦SRa≦1.0 and a maximum surface roughness SRmax (μm) of 1≦SRmax≦4.

5. A polyamide film production method as set forth in claim 3, wherein the rotary cooling roll has an average surface roughness SRa (μm) of 0.2≦SRa≦1.0 and a maximum surface roughness SRmax (μm) of 1≦SRmax≦4.

6. A polyamide film production method as set forth in claim 1 or 2, wherein a tenter driven by a linear motor is employed for biaxial stretching.

7. A polyamide film production method as set forth in claim 3, wherein a tenter driven by a linear motor is employed for biaxial stretching.

8. A polyamide film production method as set forth in claim 4, wherein a tenter driven by a linear motor is employed for biaxial stretching.

* * * * *